Figure 1:
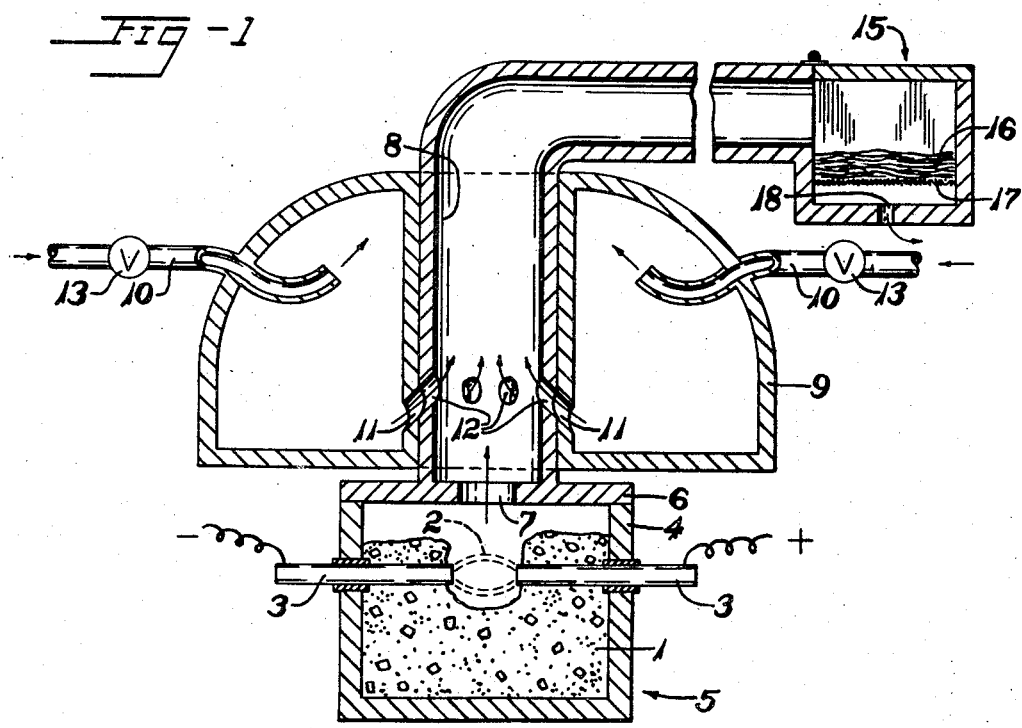

Dec. 23, 1958 D. S. SEARS 2,865,881
RUBBERY COMPOSITION REINFORCED WITH NITROGEN CONTAINING
SILICON MONOXIDE AND PROCESS FOR MAKING SAME
Original Filed May 28, 1954

INVENTOR.
DANIEL S. SEARS
BY
*Denleigh S. Matthews*
ATTY

United States Patent Office 2,865,881
Patented Dec. 23, 1958

2,865,881
RUBBERY COMPOSITION REINFORCED WITH NITROGEN CONTAINING SILICON MONOXIDE AND PROCESS FOR MAKING SAME

Daniel S. Sears, Henrico County, Va., assignor to The B. F. Goodrich Company, New York, N. Y., a corporation of New York Original application May 28, 1954, Serial No. 433,099, now Patent No. 2,823,980, dated February 18, 1958. Divided and this application January 16, 1957, Serial No. 637,346

18 Claims. (Cl. 260—41)

This invention relates to rubbery compositions reinforced with finely-divided, substantially fibrous, solid, silicon monoxide having a high surface area and to methods for making the same.

When sand and coke are heated to a high temperature by means of an electric arc, there is formed a product volatile at this high temperature which has the composition SiO. When this product is allowed to condense to the solid state in a vacuum, there is formed a brown pigment disclosed by Potter in "Transactions of the American Electrochemical Society," vol. XII, 1907, pages 191 to 228, and in U. S. Patents 875,286, 875,675 and 1,104,384 and by Tone in U. S. Patent 993,913. This material has been alleged to be silicon monoxide and has been called "Monox" by Potter. It collects in an ultra fine state of subdivision and comprises a substantial proportion of fibrous particles having an average particle length of about 50 to 600 millimicrons and a surface area of about 60 to 200 square meters per gram. The ratio of the width to length of the fibrous particles may vary from about 1:10 to 1:50. Spherical and horn-like particles are present in the mixture in a minor amount and have an average particle size of about 5 to 200 mu and a surface area of up to 300 m.$^2$/g. A method for obtaining silicon monoxide substantially or essentially spherical in shape including its use and the use of fibrous silicon monoxide as a reinforcing pigment in rubbery materials is also set forth in copending application of Edwin B. Newton and Daniel S. Sears, Serial No. 433,291, entitled "Reinforcement of Rubber," and filed May 28, 1954. Recent studies have shown that "Monox" is not silicon monoxide but a condensed disproportionation product of gaseous silicon monoxide, which exists only at high temperatures, and is more correctly represented by the formula $$[(Si)_x \cdot (SiO_2)_y]$$

where $x$ and $y$ are whole numbers.

In the processes described in the prior art before the present invention, the silicon-monoxide gas produced in the furnace was allowed to rush forth in a turbulent manner into a vacuum chamber to provide a product which contained an appreciable amount of spherical and horn-like particles mixed with the fibers. However, these spherical and horn-like particles do not contribute materially to the reinforcement of rubber as compared to fibers. Yet with the method and apparatus of the prior art, it is not possible to readily control or suppress their amount or formation and to maintain the amount of fibers constant since the furnace efficiency and pressure of gases produced decreases while the vacuum is reduced during operation. Moreover, the processes of the prior art were batch type processes which do not lend themselves readily to commercial practice due to the necessity of removing the product formed, removing the fused and unreacted coke-sand mixture, recharging the furnace and evacuating the condensing chamber for each run. Furthermore, the apparatus used required careful sealing to maintain the vacuum and avoid ingress of air which would tend to oxidize the silicon monoxide to silicon-dioxide gas.

An object of this invention is to provide rubbery compositions reinforced with solid, substantially fibrous, particulate silicon-monoxide compositions having a large surface area.

Another object of this invention is to provide a method for producing rubbery compositions reinforced with solid, substantially fibrous, particulate silicon-monoxide compositions of large surface area.

Figure 2:

These and other objects and advantages of the present invention will become more apparent to those skilled in the art from the following detailed description, examples, and drawing wherein:

Fig. 1 is a diagrammatic representation of an arrangement of apparatus for producing the novel solid, substantially fibrous, particulate silicon-monoxide compositions described herein; and Fig. 2 is a photomicrograph of the novel silicon-monoxide compositions produced by the method shown herein.

It has now been discovered according to the present invention that by contacting gaseous silicon monoxide with an inert gas containing a gaseous amine under substantially nonturbulent conditions, preferably under conditions of lamellar flow, and condensing said monoxide gas in the presence of said inert and amine gases, substantially fibrous, finely-divided or particulate, solid silicon-monoxide compositions containing from about 1 to 8% by weight of nitrogen and having a large surface area are obtained. A minor amount of the composition may consist of spherical particles. While the fiber-like particles obtained by the present invention have about the same length, color, structure and surface area of the prior art "Monox," they exhibit a more uniform width and length, show few spherical and horn-like particles mixed therewith and are more tendrilous than when condensing silicon monoxide with an inert gas containing appreciable amounts of available oxygen under turbulent or nonturbulent conditions or when condensing silicon monoxide gas in a vacuum. Moreover, by virtue of the use of the method and apparatus disclosed herein it is possible to continuously produce solid, particulate, substantially fibrous silicon monoxide at atmospheric pressure avoiding the need for repeated shutdown and removal of product, cleaning of the furnace, recharging, and evacuation of the apparatus. Furthermore, extensive sealing of the apparatus to maintain extremely low pressures or a vacuum is not required as the flowing inert gas tends to keep out the oxygen of the atmosphere and extra reinforcement to withstand high pressures and the use of cooling water are also not required.

As shown in the drawing, Fig. 1, charge 1 of essentially equal moles of silica and carbon are subjected to arc 2 between electrodes 3—3, connected to a suitable source of electric power not shown, passing through walls 4—4 of the furnace, generally indicated at 5. The walls of the furnace are suitably insulated and strengthened and the electrodes are insulated from the walls, desirably cooled and may be attached to means to feed them continuously into the furnace chamber as they are consumed in accordance with practices well known in the art. The reaction which takes place in an inert atmosphere in the furnace is represented as follows:

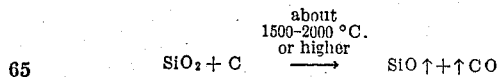

The top 6 of the furnace contains port 7 through which the silicon-monoxide and carbon-monoxide gases resulting from the reaction pass to L-shaped chamber or tube 8 surrounded by enclosed chamber 9. The sides of chamber 9 contain inlet tubes 10—10 permitting the entry of the inert gas such as commercial grade nitrogen gas and the gaseous amine such as ammonia from sources (not shown) such as gas cylinders and which fill the chamber uniformly and flow from chamber 9 by means of ports 11—11 in the base thereof which register with pors 12—12 in the base of the tube 8 to mix with the silicon-monoxide and carbon-monoxide gases issuing from the furnace with a minimum of turbulence. Flow regulating valves 13—13 control the entry of the nitrogen and ammonia mixture into the system. The mixture of gaseous nitrogen, residual ammonia, condensed silicon monoxide and carbon monoxide is then delivered to collecting chamber 15 where the fibrous product 16 is deposited on screen 17 and the carbon monoxide, nitrogen and unused ammonia gases are discharged to the atmosphere by means of port 18 or led to suitable gas-collecting apparatus for further use. While most of the silicon-monoxide gas will condense to a solid product in tube 8 and be carried by the gases to collector 15, some of it may condense in collector 15. Instead of the collector 15 being of rigid construction it may be a gas pervious bag or other collecting means such as a cyclone-type collector, etc. In place of an arc furnace, a resistance furnace or other high temperature furnace may be used. Accordingly, it is seen that the mixture of inert gas and oxygen-absorbing gas enters the condensing tube to provide a cone-like envelope of inert gas rising about the silicon monoxide gas to disperse into the silicon monoxide gas and condense the same to form fibrous particles.

By proper adjustment of the valves of the gas-conveying systems and the feed rate of the charge to the furnace, it is possible to control the rate of silicon-monoxide gas flowing into the condensing chamber as well as the amount of inert gas and gaseous amine to obtain continuously a silicon-monoxide mixture of a generally fixed particle size range.

Moreover, fresh supplies of coke and sand may continuously be fed to the furnace by means of a screw conveyor or a ram and the product may be withdrawn continuously from collector 15 in the system to the outside by means of another conveyor while the inert gas and any unused ammonia can be recirculated back to the condensing chamber, if desired to save such gas or gases, as shown in the apparatus and method in copending application of Daniel S. Sears, Serial No. 433,020, entitled "Method of Making Pigment," and filed May 28, 1954. The series of ports shown in the condensing chamber also may be replaced with an open ring or pipes from the inert gas supply can be directly placed about the port 7 in the condensing chamber to direct the column of inert gas and ammonia upward substantially parallel to the inflowing silicon-monoxide gas stream to provide lamellar flow. While it is possible to introduce the condensing gases into the furnace proper to mix with the silicon-monoxide gas before it passes through port 7, it is not too desirable as such procedure tends to create some turbulence and to reduce the efficiency of the furnace.

Thus, in the method of the present invention, it is possible to continuously feed raw material to the furnace and withdraw silicon monoxide from the collecting chamber while the inert gas or gases are continuously circulated back to the condensing chamber. Once the ratio of inert-condensing gas to silicon-monoxide gas has been established in a continuous process using recirculating gases, additional inert gas and ammonia from outside the system are not required and inert gas to compensate for that produced by the reaction in the furnace can be vented or bled off as desired to avoid excessive pressures. Moreover, the carbon monoxide produced in the system can be used to replace gradually essentially all of the nitrogen, and ammonia, if present, by careful bleeding or venting of the inert gases from the system. Some additional inert gas may be necessary, of course, to compensate for possible leaks in the apparatus. The electrodes may also be continuously supplied to the furnace so that the process need not be stopped to replenish electrodes. Accordingly, shutdown of operations need only occur when repairing the furnace lining, etc.

The fibrous finely-divided product 16—16 of this invention is shown in Fig. 2 which represents a magnification of about 40,000×, mixed with horn-like particles 20—20 and spherical particles 21—21. The sample was prepared for examination by milling into rubber which was then diluted with solvent to make a rubber cement. The cement was then spread on a slide coated with Formvar. After drying, most of the rubber was removed by soaking the slide in the solvent leaving the particles where they were originally laid down. The material was then photographed using an electron microscope.

The silica used in the arc reduction process may be sand, quartz, or mineral silicates which do not contain impurities which would volatilize during the reaction or form products which would adversely affect the properties of the fibrous silicon monoxide. The carbon may be anthracite, carbon black, coal or petroleum coke essentially free of volatiles and other matter which would provide deleterious amounts of impurities. Silicon metal or silicon carbide may also be used in place of carbon in the reduction process. However, it is preferred to use coke or carbon in order to obtain the highest yields of silicon monoxide. While mol ratios of 1:1 sand to coke are generally used in the furnace, these ratios may be varied somewhat with obtainment of satisfactory results. However, wide variations in mol ratios are not desired as such may tend to reduce the amount of product obtained while increasing the amounts of CO and tending to produce $SiO_2$ of which little or none is normally produced.

The inert gas used in contacting and condensing the silicon monoxide vapor emanating from the furnace may be carbon monoxide, nitrogen, argon, helium, neon and the like, and mixtures thereof. It will be appreciated that where a reduction process employing carbon is used, CO may also be evolved with the SiO gas. However, additional CO is necessary to provide for the proper dilution and condensation of the SiO in the system. The inert gas may be of commercial grade, that is, it may contain a minor amount, up to 0.5% of oxygen. It is a feature of the present process that commercial grades of inert gases may be employed. It is unnecessary to employ the essentially pure grades which are very expensive. Nor is it necessary to purify the commercial grades prior to use. It has been found that the addition of from about 0.5 to 9% by volume of a gaseous amine such as ammonia, an alkyl amine, or an arylamine, the balance being the added inert gas will provide the fibrous products of the present invention. While generally unnecessary, a pure inert gas can also contain ammonia, and the like, which offers some improvement in fiber length. Larger or smaller amounts of the gaseous amine do not result in the production of silicon-oxygen containing compositions of the desired surface area and of fibrous structure but rather produce a predominating amount of or all spherical particles. Further, larger amounts of the amine increase the residual nitrogen content above that desired in the final product. About 9% by volume of the amine-containing gas in the inert gas stream appears to be the maximum that can be tolerated with obtainment of products according to the present invention. When using such amine-containing gases, the products of the present invention will contain from about 1 to 8% by weight of nitrogen (Kjeldahl analysis). X-ray diffraction of the new silicon monoxide shows silicon lines as well as the silica (amorphous) halo.

The mixture of commercial inert gas and ammonia gases should be introduced into the silicon monoxide gas stream at a low velocity to mix with the silicon-monoxide gas under conditions substantially free of turbulence. High velocities are to be avoided since they create turbulence in the cooling gases to prevent the formation of fibrous products. While obviously some minor turbulence will occur when the silicon monoxide gas stream contacts the incoming inert and amine gas stream, it should be kept at a minimum. Likewise, it is apparent that some turbulence will occur in the layers of the gas stream adjacent the walls of the apparatus or where there are protuberances. Accordingly, the silicon-monoxide gas and the condensing gases should flow at a sufficiently slow rate and should meet each other at small angles of contact and the apparatus should contain a minimum number of protuberances so that the flow is substantially non-turbulent. Preferably, the inflowing inert and amine-containing gas mixture should form a column about the silicon monoxide gas as it issues from the furnace to provide gas flow essentially in the same direction or lamellar flow which is essentially free of turbulence. The ratio of silicon-monoxide gas produced to inflowing inert-condensing gas and gaseous amine can vary from 1:3 to 1:15 ft.$^3$/min. to provide a large volume in which the SiO gas can disperse and condense and preferably should be about 1:8 ft.$^3$/min. It has been found that nitrogen containing a minor amount of ammonia at a rate of 40 ft.$^3$/min. contacting SiO gas, produced at rate of about 8 ft.$^3$/min. will provide about 10 pounds per hour of the fibrous product of the present invention. It, of course, is apparent that the method and apparatus disclosed by the present invention and their details can be varied considerably with obtainment of satisfactory results.

The following examples will serve to illustrate the invention with more particularity to those skilled in the art.

EXAMPLE I

One mol each of sand and coke were charged to an arc furnace which was closed except for an opening in its top to permit the gaseous reaction product to escape to a condensing chamber containing 5 ports for entry of the condensing gases and symmetrically positioned about the opening in the furnace top. The condensing chamber was connected in turn to a bag collector. The system was flushed with nitrogen containing about 10 p. p. m. $O_2$ and kept at atmospheric pressure. An arc was struck to initiate reaction between the coke and sand, and, as the gaseous silicon monoxide evolved at a rate of 1½ li./min., it was mixed with commercial nitrogen gas containing about 0.5% oxygen and about 2.6% ammonia at a rate of 20 liters per minute without causing appreciable turbulence. After the run was completed, the product obtained was removed from the collector and examined. It contained about 5% combined nitrogen, had a surface area of about 111 m.$^2$/g. and was substantially entirely in the form of fibers which had a ratio of width to length of from 1 to 10 to from 1 to 30. The fibrous particles had an average fiber length of about 300 millimicrons with a range of about 80 to 600 millimicrons. On the other hand, when the same procedure was followed except that commercial nitrogen containing about 0.5% oxygen was used, the product had a surface area of 73.5 m.$^2$/g., and the fibrous particles in the product had an average particle size of about 50 millimicrons with a range of 20 to 80 millimicrons. However, a considerable amount of the product was also in the form of spherical particles. These results disclose that the oxygen present in commercially available inert or condensing gases tends to prevent formation of fibrous particles. While the surface area of these particles may be similar, superior reinforcing properties in rubber are obtained when the highly fibrous products are used.

EXAMPLE II

The procedure followed in this example was the same as set forth in Example I, above, except that variations were made in the flow rates of the condensing gases and in the types of gases used. The result of the tests are shown in Table A below:

*Table A*

VARIATIONS IN GASES AND GAS RATES

| Run No. | Condensing Gases | Inflow Rate of Condensing Gases | Surface Area of Condensed SiO—m.$^2$/g. | Percent Fibrous | Ratio of Width to Length of Fibers |
|---|---|---|---|---|---|
| 1 | $N_2$(Commercial) | 40 li./min | 92 | 20 | 1 to 6 |
| 2 | $N_2$(Commercial) | High velocity Jets | 214 | none | 1 to 1 |
| 3 | Air | High velocity Jets at 9 p. s. i. 20 gauge needles. | 134.7 | 5 | 1 to 2 |
| 4 | $N_2$(Commercial) / $CO_2$ | 10 li./min / 10 li./min | 99 | none | 1 to 1 |
| 5 | $N_2$(Commercial) / $CO_2$ | 18 li./min / 2 li./min | 121 | 15 | 1 to 3 |

The above data indicate that high velocity input of condensing gases which cause turbulence in the mixing gas streams will afford high surface area but will fail to produce the requisite fibrous structure desired in the particles. Moreover, air or mixtures of nitrogen with $CO_2$, normally considered inert, will not produce a fibrous structure according to the present invention. Apparently the carbon dioxide does have oxygen available for oxidation.

EXAMPLE III

The procedure followed in this example was the same as that shown in Example I, above, except that various amounts of ammonia were mixed with nitrogen (Comm.) gas as it entered the reaction chamber. The results obtained are shown in Table B below:

*Table B*

MIXTURES OF $N_2$ AND $NH_3$ AS CONDENSING GASES

| Run No. | Condensing Gases | Inflow Rate of Condensing Gases, li./min. | Surface Area of Condensed SiO | Percent Fibrous Particles present | Ratio of Width to Length |
|---|---|---|---|---|---|
| 1 | $N_2$(Commercial) / $NH_3$ | 19.8 / .2 | 120 | 85 | 1 to 35 |
| 2 | $N_2$(Commercial) / $NH_3$ | 19.5 / .5 | 126 | 89 | 1 to 32 |
| 3 | $N_2$(Commercial) / $NH_3$ | 19 / 1 | 110 | 72 | 1 to 25 |
| 4 | $N_2$(Commercial) / $NH_3$ | 18 / 2 | 91.3 | 40 | 1 to 5 |
| 5 | Air / $NH_3$ | 18 / 2 | 69 | 5 | 1 to 4 |

The above data indicate that impure nitrogen containing minor amounts of ammonia under essentially non-turbulent conditions will produce fibrous, condensed silicon monoxide products of good surface area and a high ratio of width to length, although at about 10% or more ammonia in the gas stream, the fibrous structure is essentially lost. Run No. 5 indicates that air and ammonia will not form an atmosphere conducive to the production of fibrous products. The density of the products so formed and the percentage of nitrogen present is indicated below:

| Run No. | Density of Product | Percent, N in Product |
|---|---|---|
| 1 | 2.420 | 3.37 |
| 2 | 2.480 | 5.02 |
| 3 | 2.502 | 6.87 |
| 4 | 2.539 | 9.28 |

With increasing amounts of ammonia in the $N_2$ gas stream, the product exhibits a higher density and shows greater percentages of nitrogen present. However, the fibrous structure is lost at high concentrations of ammonia.

EXAMPLE IV

The method of this example was the same as Example I, above, except that purified nitrogen was mixed with $NH_3$. The properties of the product obtained are noted in Table C below:

Table C

MIXTURES OF PURIFIED $N_2$ AND $NH_3$

| Run No. | Condensing Gas Mixture | Inflow Rate of Condensing Gases, li./min. | Surface Area of Condensed SiO—m.²/g. | Percent Fibrous Particles Present | Ratio of Width to Length |
|---|---|---|---|---|---|
| 1 | $N_2$ / $NH_3$ | 19.6 / .4 | 102 | 90 | 1 to 36 |

EXAMPLE V

The method of this example was the same as Example I, above, except that a mixture of 0.5 li./min. monomethyl amine and 19.5 li./min. nitrogen (commercial) was used for condensing the silicon monoxide. The condensed silicon monoxide contained about 4.1% by weight of nitrogen, had a surface area of about 100 m.²/g. and was about 80% fibrous in which the fibers generally had a ratio of width to length of about 1 to 25.

The fibrous, finely-divided solid silicon monoxide composition of this invention is incorporated as a rubber-reinforcing agent into any rubbery material capable of reinforcement with carbon blacks. Among the group of rubbery materials capable of reinforcement are natural rubber, such as caoutchouc which is essentially a conjugated polymer of isoprene, balata, gutta percha, and the like, or synthetic rubbers such as rubbery polychloroprene and rubbery polymers of the open-chain conjugated dienes having from 4 to 8 carbon atoms such as the butadiene-1,3 hydrocarbons which include butadiene-1,3, isoprene, 2,3-dimethyl butadiene-1,3,1,4-dimethyl butadiene-1,3, and the like; or the rubbery copolymers of these and similar conjugated diolefins with each other or with such copolymerizable monomeric materials as isobutylene, styrene, acrylonitrile, methacrylonitrile, methyl acrylate, methyl methacrylate, ethyl acrylate, ethyl methacrylate, 2-vinyl pyridine, and similar materials and mixtures of these. The rubbery copolymers contain at least 50% by weight of the conjugated diene and preferably from 55 to 85% by weight. Terpolymers employing at least 35% diene may also be employed if desired. Typical rubbers in the above groups well known to the art are Buna S, GR-S, Buna N, GR-A, Neoprene, Butyl and the like.

Polyacrylic synthetic rubbers can also be reinforced according to this invention. They are prepared by the polymerization of an acrylic acid ester or mixtures of acrylic acid esters in bulk or by mass polymerization of the monomers or by the polymerization of the monomers in aqueous emulsions. They can also be prepared by the copolymerization of acrylic acid esters with about 5 to 10 percent by weight of a chlorine-containing monomer such as chloroethyl vinyl ether, acrylonitrile, vinyl chloride, dichlorodifluoro ethylene, or styrene in mass or aqueous emulsion polymerizations. Specific acrylic acid esters include among others methyl acrylate, ethyl acrylate, propyl acrylate, butyl acrylate, octyl acrylate, methyl methacrylate, ethyl methacrylate, butyl methacrylate, methyl ethacrylate and the like. These polyacrylic synthetic rubbers are well known to the art and can be used alone or mixed with other rubbery materials such as rubbery polychloroprene, butadiene-1,3 and styrene copolymers, natural rubber, etc. in proportions of from about 80 to 20 parts by weight of polyacrylic rubber to 20 to 80 parts by weight of diene rubber.

Rubbery compositions reinforced with the fibrous material of the present invention contain a major amount of the rubber and a minor amount of the new reinforcing pigment described herein. However, for optimum results from about 20 to 45 percent by weight of the fibrous, finely-divided silicon-oxygen containing composition is used with the balance being the rubbery material. While very minor amounts of the fibrous material will impart some reinforcement, satisfactory results as to elongation, modulus and tensile strength are not obtained until about 20% by weight of fibrous material is used in the rubber. Above about 45% by weight of fibrous material the rubbery stocks after vulcanization become too boardy and hard.

In addition the rubbery material may contain minor amounts of compounding ingredients such as vulcanizing agents, accelerators, antioxidants, pigments and the like. Examples thereof are sulfur, zinc oxide, zinc stearate, titanium dioxide, di-dodecylamine, pine tar, phenyl beta naphthylamine, 2-mercapto benzothiazole, diortho tolyl guanidine, n-pentamethylene ammonium pentamethylene dithiocarbamate, etc.

The fibrous material may be mixed readily with the rubbery material and compounding ingredients on a roll mill or in a Banbury mixer. It is surprising to find that unlike carbon black the fibrous structure of the silicon monoxide is not lost on milling. Alternatively, it can be mixed with latex which is then coagulated and dried. The resulting rubber can then be vulcanized in a mold at temperatures of from 250 to 300° F. for various times depending on the type of cure desired.

The following example will illustrate a representative rubbery composition containing the fibrous reinforcing agent of the present invention.

EXAMPLE VI

Sixty-five parts by weight of fibrous condensed, nitrogen containing silicon monoxide having been prepared as disclosed in Example I supra, were mixed with 100 parts by weight of natural rubber, 5 parts by weight of zinc oxide, 1 part by weight each of pine tar, mercaptobenzothiazole and phenyl beta naphthylamine, 1.5 parts by weight each of stearic acid and didodecylamine and 3 parts by weight of sulfur. Mixing was carried out until all the components were uniformly dispersed throughout the mixture which was then cured at 280° F. for 30 minutes. The cured composition was then tested and it exhibited a 300% modulus of 2,320, a tensile strength at break of 3690 p. s. i., and an elongation at break of 460 percent. A conventional natural rubber-carbon black reinforced composition for a 30 minute cure will exhibit a modulus of 1,850, a tensile of 4,450 and an elongation of 600. Thus, the rubbery compound containing the fibrous silicon monoxide of the present invention exhibited a modulus of 125%, a tensile of 83%, and an elongation of 77% of that of the carbon black compound.

The fibrous, finely-divided product of the present invention is particularly useful in the reinforcement of mechanical rubber goods, tire compositions, shoe soling and other rubbery materials; it also can be used to produce hard, strong rubber products having excellent electrical insulation properties. Moreover, it can be employed as a filler in sound and heat insulating compositions.

In summary, the present invention teaches that a substantially fibrous, solid condensed silicon monoxide can readily be prepared by contacting and condensing silicon-monoxide gas without turbulence in the presence of an impure or pure gas containing an amine. The new fibrous condensed silicon monoxide exhibits a very fine particle size, good surface area and can be readily milled into rubber without disintegration of the fibers to reinforce the same and provide on vulcanization rubbers having properties comparable to those obtained with carbon blacks. Moreover, the product of the present invention will also find utility in other compositions as a filler and reinforcing material. This application is a divisional application of copending application of Daniel S. Sears, Serial No. 433,099, filed May 28, 1954, for "Pigment and Process for Making the Same."

Having thus described the invention what is claimed as patentably new and is desired to be secured by U. S. Letters Patent is:

1. A composition of matter comprising a rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, and a compound comprising a condensed, particulate, solid, nitrogen-containing silicon monoxide, $$(Si)_x \cdot (SiO_2)_y \cdot (N)_z$$

where $x$ and $y$ are whole numbers and where $z$ is a number such that the proportion of nitrogen is from about 1 to 8% by weight of said silicon monoxide as determined by Kjeldahl analysis, and containing a substantial amount of fibers, said compound being present in a minor amount based on the total amount of said rubbery material and said compound and sufficient to reinforce said rubbery material.

2. A composition of matter comprising a rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, and a compound comprising a condensed, particulate, solid, nitrogen-containing silicon monoxide, $$(Si)_x \cdot (SiO_2)_y \cdot (N)_z$$

where $x$ and $y$ are whole numbers and where $z$ is a number such that the proportion of nitrogen is from about 1 to 8% by weight of said silicon monoxide as determined by Kjeldahl analysis, and containing a substantial amount of fibers having a ratio of width to length of from about 1:10 to 1:50, an average particle length of from about 50 to 600 millimicrons, a surface area of from about 60 to 200 square meters per gram and exhibiting the lines of silicon and the halo of amorphous silica on X-ray diffraction, the proportions of said rubbery material and said compound being from about 55 to 80% by weight of said rubbery material to from 45 to 20% by weight of said compound.

3. An article of manufacture comprising a vulcanizate containing a rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, and a compound comprising a condensed, particulate, solid, nitrogen-containing silicon monoxide, $(Si)_x \cdot (SiO_2)_y \cdot (N)_z$, where $x$ and $y$ are whole numbers and where $z$ is a number such that the proportion of nitrogen is from about 1 to 8% by weight of said silicon monoxide as determined by Kjeldahl analysis, and containing a substantial amount of fibers, said compound being present in a minor amount based on the total amount of said rubbery material and said compound and sufficient to reinforce said rubbery material.

4. An article of manufacture comprising a vulcanizate containing a rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubber copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, and a compound comprising a condensed, particulate, solid, nitrogen-containing silicon monoxide, $(Si)_x \cdot (SiO_2)_y \cdot (N)_z$, where $x$ and $y$ are whole numbers and where $z$ is a number such that the proportion of nitrogen is about 1 to 8% by weight of said silicon monoxide as determined by Kjeldahl analysis, and containing a substantial amount of fibers having a ratio of width to length of from about 1:10 to 1:50, an average particle length of from about 50 to 600 millimicrons, a surface area of from about 60 to 200 square meters per gram and exhibiting the lines of silicon and the halo of amorphous silica on X-ray diffraction, the proportions of said rubbery material and said compound being from about 55 to 80% by weight of said rubbery material to from 45 to 20% by weight of said compound.

5. An article of manufacture according to claim 4 wherein said rubbery material comprises a polymer of an acrylic acid ester.

6. An article of manufacture according to claim 4 wherein said rubbery material comprises a polymer of an open-chain conjugated diene.

7. An article of manufacture according to claim 6 in which said rubbery material comprises a copolymer of a major amount of butadiene-1,3 and a minor amount of styrene.

8. An article of manufacture according to claim 6 in which said rubbery material comprises a copolymer of a major amount of butadiene-1,3 and a minor amount of acrylonitrile.

9. An article of manufacture according to claim 6 in which said rubbery material comprises a copolymer of a major amount of isobutylene and a minor amount of isoprene.

10. An article of manufacture according to claim 6 in which said rubbery material comprises a polymer of isoprene.

11. The method which comprises mixing a vulcanizable unvulcanized rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, with a compound comprising a condensed, particulate, solid, nitrogen-containing silicon monoxide, $(Si)_x \cdot (SiO_2)_y \cdot (N)_z$, where $x$ and $y$ are whole numbers and where $z$ is a number such that the proportion of nitrogen is from about 1 to 8% by weight of said silicon monoxide as determined by Kjeldahl analysis, and containing a substantial amount of fibers, said compound being present in a minor amount based on the total amount of said rubbery material and said compound and sufficient to reinforce said rubbery material, and vulcanizing the resulting mixture.

12. The method which comprises mixing a vulcanizable unvulcanized rubbery material selected from the group consisting of a rubbery homopolymer of a diene, a rubbery copolymer of a mixture of dienes, a rubbery copolymer of at least one diene and at least one copolymerizable monomer having a single carbon to carbon double bond and selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monomer having a single carbon to carbon double bond and selected from the group consisting of chloroethyl vinyl ether, acrylonitrile, vinyl chloride, dichlorodifluoro ethylene and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms, with a compound comprising a condensed, particulate, solid, nitrogen-containing silicon monoxide, $(Si)_x \cdot (SiO_2)_y \cdot (N)_z$, where $x$ and $y$ are whole numbers and where $z$ is a number such that the proportion of nitrogen is from about 1 to 8% by weight of said silicon monoxide as determined by Kjeldahl analysis, and containing a substantial amount of fibers having a ratio of width to length of from about 1:10 to 1:50, an average particle length of from about 50 to 600 millimicrons, a surface area of from about 60 to 200 square meters per gram and exhibiting the lines of silicon and the halo of amorphous silica on X-ray diffraction, the proportions of said rubbery material and said compound being from about 55 to 80% by weight of said rubbery material to from about 45 to 20% by weight of said compound, to form a homogenous appearing mixture and vulcanizing said mixture.

13. The method according to claim 12 wherein said rubbery material comprises a polymer of an acrylic acid ester.

14. The method according to claim 12 wherein said rubbery material comprises a polymer of an open chain conjugated diene.

15. The method according to claim 14 in which said rubbery material comprises a copolymer of a major amount of butadiene-1,3 and a minor amount of styrene.

16. The method according to claim 14 in which said rubbery material comprises a copolymer of a major amount of butadiene-1,3 and a minor amount of acrylonitrile.

17. The method according to claim 14 in which said rubbery material comprises a copolymer of a major amount of isobutylene and a minor amount of isoprene.

18. The method according to claim 14 in which said rubbery material comprises a polymer of isoprene.

References Cited in the file of this patent

UNITED STATES PATENTS

| | | |
|---|---|---|
| 2,311,613 | Slayter | Feb. 16, 1943 |
| 2,681,327 | Brown | June 15, 1954 |